United States Patent [19]

Karayannis et al.

[11] 3,950,268

[45] Apr. 13, 1976

[54] CATALYST FOR THE POLYMERIZATION OF OLEFINS

[75] Inventors: Nicholas M. Karayannis, Hinsdale; Sam S. Lee, Hoffman Estates, both of Ill.

[73] Assignee: Standard Oil Company, Chicago, Ill.

[22] Filed: July 15, 1974

[21] Appl. No.: 488,542

Related U.S. Application Data

[63] Continuation of Ser. No. 196,719, Nov. 8, 1971, abandoned.

[52] U.S. Cl. ........ 252/429 B; 252/429 C; 260/93.7; 260/94.9 C; 260/94.9 E
[51] Int. Cl.² ...................... B01J 31/38; C08F 4/66
[58] Field of Search .................... 252/429 B, 429 C; 260/94.9 C, 94.9 E

[56] References Cited
UNITED STATES PATENTS

| | | | |
|---|---|---|---|
| 3,139,418 | 6/1964 | Marullo et al. | 260/94.9 C |
| 3,240,773 | 3/1966 | Boor | 260/94.9 C |
| 3,288,773 | 11/1966 | Harban et al. | 260/94.9 C |
| 3,449,263 | 6/1969 | Watt | 260/94.9 E |
| 3,476,730 | 11/1969 | Streck et al. | 260/94.9 C |
| 3,639,375 | 2/1972 | Staiger et al. | 260/94.9 C |

FOREIGN PATENTS OR APPLICATIONS

| | | |
|---|---|---|
| 966,788 | 8/1964 | United Kingdom............ 260/94.9 C |
| 918,740 | 2/1963 | United Kingdom |
| 1,128,724 | 10/1968 | United Kingdom |
| 44-20,098 | 8/1969 | Japan |

*Primary Examiner*—Edward J. Smith
*Attorney, Agent, or Firm*—Reed F. Riley; Arthur G. Gilkes; William T. McClain

[57] ABSTRACT

A novel catalyst for producing crystalline poly alpha-olefins in excellent yields which coproduces substantially zero percent of low-molecular-weight and amorphous polymers is herein described. This novel catalyst is useful in polymerization techniques which use a solvent or those in which condensed monomer is the liquid phase or those in which polymerization is accomplished using monomer substantially in the vapor phase.

4 Claims, No Drawings

3,950,268

CATALYST FOR THE POLYMERIZATION OF OLEFINS

This is a continuation of application Ser. No. 196,719, filed Nov. 8, 1971, now abandoned.

SUMMARY OF THE INVENTION

This invention relates to a novel catalyst for the polymerization of terminal olefins to produce normally solid crystalline polymers and more specifically to a novel catalyst for polymerization of alpha-olefins which produces in excellent yields normally solid crystalline polymeric products wherein coproduced low-molecular-weight and amorphous polymers are substantially absent.

In accordance with the instant invention, alpha-olefins are polymerized to normally solid polymers at atmospheric pressure and above and at moderate temperatures with a catalyst system comprising: (a) a trialkyl aluminum compound or an alkyl aluminum halide or mixtures thereof, (b) a halide of a metal belonging to Groups IV B to VI B, inclusive, of the Periodic Table, and (c) an organometallic chalcogenide or a mixture thereof with an amine oxide. The polymeric products produced using the above described catalyst can have low-molecular-weight and amorphous components, as measured by extraction using n-hexane, of substantially less than one percent of the total polymer yield.

BACKGROUND OF THE INVENTION

Polymers of alpha-olefins prepared in the presence of heterogeneous catalyst systems, as for example, polypropylene prepared using a catalyst comprised of diethyl aluminum chloride and titanium trichloride, contain greater or lesser amounts of low-molecular-weight and amorphous components which, when taken alone, are viscous oils or soft, tacky solids. The presence of these alkane-soluble materials in the polymers leads to difficulties during their fabrication and to inferior physical properties of the finished item, and hence are almost always removed in commercial processes for the production of polypropylene.

In the past tertiary amine oxides, U.S. Pat. No. 3,288,773, have been reported as useful (c) components, supra, to reduce the alkane-soluble fraction produced during the polymerization process. Also, in British Pat. No. 1,000,348 heterocyclic amines and amine oxides are suggested for use as the (c) component of a catalyst system to obtain polymeric products of "unusually high crystallinity". So too, in British Pat. No. 921,954 tertiary amine oxides and heterocyclic amine oxides are claimed as polymerization process additives to increase the crystalline polypropylene made using a process involving a Ziegler-type polymerization catalyst. In none of the above referred to patents, however, has the additive been claimed to reduce the alkane-soluble polymers to a point where no extraction would be necessary in the commercial process while still maintaining a commercially feasible yield of crystalline polymer. A polymer product containing about 2 percent or less of n-hexane-soluble polymer would not require a separation step prior to use and hence would be economically advantageous.

Now it has been found that by using as the (c) component an organometallic chalcogenide or a mixture comprising an amine oxide and an organometallic chalcogenide, a substantially alkane-soluble-free, poly alpha-olefin can be made in yields which are equal to or superior to those presently obtained in the better slurry-type processes.

STATEMENT OF THE INVENTION

As shown in Table I, the n-hexane-soluble fraction can be reduced by the instant invention when a mixture of an amine oxide and organometallic chalcogenide is used. Table I shows further that the activity is not substantially affected under the conditions used when either the organometallic chalcogenide or mixtures of the latter and an amine oxide are used.

TABLE I

Comparison of Crystalline Polypropylene Activity and n-Hexane Solubles for Different (c) Components***

| (c) Component | Crystalline Polypropylene Activity grams/gram $TiCl_3$/hour | n-Hexane-Solubles (Percent) |
|---|---|---|
| (1) 2,6-lutidine-N-oxide | 22 | 4.4 |
| (2) $[(C_4H_9)_3Sn]_2S$ (0.06 grams) | 48.5 | 3.6 |
| (3) Mixture of (1) and (2)* | 45.8 | 1.5 |
| (4) $[(C_4H_9)_3Sn]_2O$ (0.06 grams) | 51 | 6 |
| (5) Mixture of (1) and (4)** | 38.7 | 4.5 |
| (6) None | 50.5 | 6.9 |

*LNO (0.06 milliliters) and $(Bu_3Sn)_2S$ (0.06 grams).
**LNO (0.06 milliliters) and $(Bu_3Sn)_2O$ (0.06 grams).
***(a) and (b) components for all runs were 0.25 grams aluminum activated $TiCl_3$ (AA $TiCl_3$) and 3.2 milliliters (25 percent wt./wt. in n-hexane) diethyl aluminum chloride in 190 milliliters of n-hexane. All runs were made using 40 p.s.i.g. propylene at 70°C. for four hours.

The *a* components useful for the herein described invention are lower alkyl derivatives and more specifically are trialkyl aluminum compounds or mixtures thereof with alkyl aluminum dihalides or dialkyl aluminum halides, dialkyl aluminum halides or mixtures thereof with alkyl aluminum dihalides. More preferably, the *a* component is triethyl aluminum or mixtures thereof with diethyl aluminum chloride or ethyl aluminum dichloride, diethyl aluminum chloride or mixtures thereof with ethyl aluminum dichloride. Most preferably, triethyl aluminum, diethyl aluminum chloride or mixtures of triethyl aluminum and ethyl aluminum are used. The amount of *a* component to be used is based upon the reactor size, the amount of *b* component used and the amount of olefin to be polymerized as is well known to one skilled in the art.

When a mixture of trialkyl aluminum and dialkyl aluminum halide is used, useful results are obtained in the range about 35 to about 65 mole percent trialkyl compound and about 65 to about 35 mole percent dialkyl compound. When a mixture of trialkyl aluminum and alkyl aluminum dihalide is used, useful results are obtained in the range about 30 to about 50 mole percent trialkyl aluminum and about 70 to about 50 mole percent alkyl aluminum halide. When a mixture of dialkyl aluminum halide and alkyl aluminum dihalide is used, useful results are obtained in the range about 70 to about 80 mole percent dialkyl aluminum halide and about 30 to about 20 mole percent alkyl aluminum dihalide.

More preferably, mixtures of triethyl aluminum and diethyl aluminum chloride, or triethyl aluminum and ethyl aluminum dichloride or diethyl aluminum chloride and ethyl aluminum dichloride in the concentration ranges given in the preceding paragraph are used.

Most preferably, the concentration range of the mixture of triethyl aluminum and ethyl aluminum dichloride mixture is about 40 to about 47 mole percent of the triethyl compound and about 60 to about 53 mole percent of diethyl aluminum chloride.

The *b* components useful herein are halides of metals from Groups IV B to VI B, inclusive, of the Periodic Table. More preferably, the *b* component is a chloride of titanium, vanadium, chromium, molybdenum, tungsten or zirconium and, most preferably, the *b* component is activated titanium trichloride. The amount of the *b* component used is based upon the amount and composition of the particular polymer to be made and is well known to one skilled in the art.

The amine oxide part of the *c* component is usefully any lower alkyl, alkaryl or aryl tertiary amine oxide, or heterocyclic amine oxide of from 1–3 aromatic rings, each ring having 0–1 nitrogen atoms, or an alpha-lower-alkyl-substituted derivative of said heterocyclic amine oxide, or an alpha, alpha-lower-alkyl-substituted derivative of said heterocyclic amine oxide. More preferably, the amine oxide part of the *c* component is a heterocyclic amine oxide of from 1–3 aromatic rings, each ring having 0–1 nitrogen atoms and derivatives thereof wherein lower alkyl groups are substituted alpha or alpha, alpha' to the nitrogen atom or atoms. Most preferably, the amine oxide part is 2,6-lutidine-N-oxide.

The chalcogenide part of the *c* component is usefully an oxide, sulfide, selenide or telluride of an alkyl, alkaryl or aryl silicon, germanium or tin radical. More preferably, this part is an oxide or sulfide of a bis-(trialkyl) or bis-(triphenyl) tin, germanium or silicon radical wherein the akyl groups contain between 1 and 6 carbon atoms or a bis-(dialkyl) or bis-(diphenyl) tin, germanium or silicon radical wherein the alkyl groups contain between 1 and 6 carbon atoms.

Usefully, the mole percentages of the amine oxide and organometallic chalcogenide parts of the mixture run from about 70 mole percent of the former and about 30 mole percent of the latter to about 98 mole percent of the former and about 2 mole percent of the latter. More preferably, the concentration range of the parts of the *c* component runs from about 70 to about 95 mole percent of the amine oxide part and from about 30 to about 5 mole percent of the organometallic chalcogenide part. Most preferably, the concentration range of the parts runs from about 95 to 82 mole percent of the amine oxide part and from about 5 to about 18 mole percent of the organometallic chalcogenide part.

The amount of the amine oxide part of the *c* component is critical and depends upon the amount of *a* component to be used. Too little of the amine oxide increases the yield of low-molecular-weight and amorphous polymer and too much of the amine oxide slows down the rate of polymerization. In general, the amine oxide can vary from about 5 mole percent of the *a* component to about 15 mole percent of the *a* component. Most preferably, the range is about 9 mole percent of *a* component to about 11 mole percent of *a* component.

The order of mixing the *a*, *b* and *c* components while not critical to reduce the a-hexane-soluble fraction does substantially effect the activity. The order which most substantially increases the activity is to first admix the amine oxide and organometallic chalcogenide and then admix the combination wth the *a* component. The *b* component is then admixed with the above mixture. Typical results are shown in Table II.

TABLE II

| Catalyst Mole Ratios** | Order of Mixing | Polypropylene Activity grams/gram TiCl₃/hour |
|---|---|---|
| 3.93/1/0/0 | Et₂AlCl, TiCl₃ | 256 |
| 3.93/1/0.072/0.33 | Et₂AlCl, BTS, LNO, TiCl₃ | 206 |
| 3.93/1/0.072/0.33 | LNO, BTS, Et₂AlCl, TiCl₃ | 372 |

Effect of Mixing Order on Polymerization Activity

*All runs made in a one gallon reactor at 70°C using 150 p.s.i.g. of propylene.
**Order of ratios in Et₂AlCl, AA TiCl₃, bis-(tributyl tin) sulfide (BTS) and 2,6-lutidine-N-oxide (LNO).

As is obvious to one skilled in the art, precautions should be taken to avoid oxygen and moisture contamination of the catalyst during its preparation and its transfer. Catalyst preparation should be carried out under an inert atmosphere using such gases as argon, nitrogen, helium etc. Normally, during use no precautions need be taken as a positive pressure of monomer gas exists within the reactor.

The temperature at which the catalyst may be used is not critical in the solution process and depends, in general, upon the particular *a* and *b* components which are used. However, at temperatures below 0°C the rate of polymerization slows down and reactor residence times become unreasonably long whereas at temperatures above 120°C., polymerization rates become too high and a loss of polymer crystallinity is found. Preferably, the temperature range in which the catalyst can be used is about 2°C to about 95°C. Most preferably, the temperature range is about 50°C to about 80°C.

The herein described catalyst system has also proved to be highly stereospecific during the solventless (bulk) polymerization of alpha-olefins and polymerizations wherein the propylene monomer is essentially all in the vapor phase.

The results for solventless polymerization runs in which liquid monomer composes the liquid phase are shown in Table III.

TABLE III

Propylene Polymerization Using the Bulk Technique

| Catalyst Mole Ratios | Crystalline Yield grams/gram TiCl₃/hour | n-Hexane Solubles (Percent) |
|---|---|---|
| Et₂AlCl/AATiCl₃/BTS/LNO 3/1/0.072/0.33 | 380.2 | 0.9 |
| Et₃Al/EtAlCl₂/AATiCl₃/BTS/LNO 0.9/1.06/1/0.069/0.163 | 352.4 | 1.1 |

*All runs accomplished in a Parr 1-liter reactor at 450 p.s.i.g propylene and 70°C.

Another variant of the polymerization technique was employed to simulate a polymerization with the catalyst of the invention where the monomer is wholly in the vapor phase. The results are shown in Table IV.

TABLE IV*

Propylene Polymerization Using a Modified Vapor Phase Technique

| Catalyst Mole Ratios | Crystalline Polypropylene, Activity grams/TiCl | n-Hexane Solubles (Percent) |
|---|---|---|
| Et₃Al/EtAlCl₂/AATiCl₃/BTS/LNO** 0.9/1.06/1/0.115/0.272 | 359.6 | 1.48 |

*Run at 40 p.s.i.g and 70°C. for 26 hours.
**2–3 milliliters of n-hexane used in catalyst preparation.

The process of the invention can be carried out at atmospheric pressure or above atmospheric pressure. Pressures up to about 20,000 p.s.i.g. or higher can be used. A particular advantage of the invention is that pressures of the order of 30 to 1000 p.s.i.g. give excellent results. When the slurry technique or the bulk phase technique is used the pressure employed need only be sufficient to maintain the reaction mixture in liquid form during the polymerization.

The organic liquid employed as solvent can be aliphatic alkanes or cycloalkanes such as pentane, hexane, heptane or cyclohexane, or a hydrogenated aromatic compound such as tetrahydronaphthalene or decahydronapthalene, or a high molecular weight liquid paraffin or mixture of paraffins which are liquid at the reaction temperature, or an aromatic hydrocarbon such as benzene, toluene or xylene, or a halogenated aromatic compound such as chlorobenzene, chloronaphthalene or ortho -dichlorobenzene. The nature of the solvent is subject to considerable variation, although the solvent employed should be liquid under the conditions of reaction and relatively inert. The hydrocarbon liquids are desirably employed. Other solvents which can be used include ethylbenzene, isopropylbenzene, ethyltoluene, n-propylbenzene, diethylbenzenes, mono- and dialkylnapthalenes, n-pentane, n-octane, isooctane, methylcyclohexane, Tetralin and Decalin. The solvents employed in practicing this invention can be advantageously purified prior to use in the polymerization reaction by contacting the solvent, for example, in a distillation procedure or otherwise, with the polymerization catalyst to remove undesirable trace impurities. Also, prior to such purification of the diluent the catalyst can be contacted advantageously with polymerizable alpha-olefin.

The polymerization time is not critical and will usually be of the order of from 30 minutes to several hours in batch processes. Contact times of from 1 to 4 hours are commonly employed in autoclave-type reactions. When a continuous process is employed, the contact time in the polymerization zone can also be regulated as desired, and in some cases it is not necessary to employ reaction or contact times much beyond one-half to 1 hour since a cyclic system can be employed by precipitation of the polymer and return of the solvent and excess monomer to the charging zone wherein the catalyst can be replenished and additional monomer introduced.

The invention is of particular importance in the preparation of highly-crystalline polypropylene, although it can be used for polymerizing polystyrene, ethylene and also for preparing pure-block and terminal-block types of copolymers of ethylene and propylene or other co-alpha-olefin monomers. The pure-block copolymer may be composed of two different blocks or may be of the types ABAB etc. or ABCABC etc. Other alpha-olefins useful in this invention contain up to 10 carbon atoms and normally are free from branching in the 2-position.

The process and catalyst of this invention are normally used with an additive to control molecular weight such as dialkyl zinc compounds or hydrogen, preferably hydrogen. Solid polymers having molecular weights greater than about 50,000 and less than about 5,000,000 result thereby. The amount of hydrogen to be used depends upon the molecular weight distribution to be obtained and is well known to those skilled in the art.

The polyolefins prepared in accordance with the invention can be extruded, mechanically melted, cast or molded as desired. They can be used to form plates, sheets, films, or a variety of molded objects which exhibit a higher degree of stiffness than do the corresponding high-pressure polyolefins. The products can be extruded in the form of pipe or tubing of excellent rigidity and can be injection molded into a great variety of articles. The polymers can also be cold drawn into ribbons, bands, fibres or filaments of high elasticity and rigidity. Fibres of high strength can be spun from the molten polyolefins obtained according to this process.

The invention is illustrated by, but not limited to, the following Examples:

GENERAL EXPERIMENTAL PROCEDURE

The components of the catalyst system are charged into a pressure bottle containing 190 milliliters of n-hexane. This is effected in a dry box under a nitrogen atmosphere. Then, the pressure bottle is air-tightly capped and its contents are allowed to react with propylene at 40 p.s.i.g. and 70°C for 4 hours. The resulting polymer is treated with methanol and n-hexane. The n-hexane insoluble fraction is characterized as crystalline polypropylene; the n-hexane soluble fraction is characterized as noncrystalline polypropylene. The crystalline activity and n-hexane solubles percentages were obtained by adding 50 milliliters of n-hexane to the polymerization slurry along with 10 milliliters of methanol and stirring for 1 hour. The mixture was then filtered and washed with about 100 milliliters of hexane and enough methanol to remove any catalyst residues from the insoluble polymer. The insoluble part was then dried at 90°C for 1 hour and weighed. The filtrate was evaporated to dryness and the residue weight was taken as the non-crystalline yield.

EXAMPLE I

Catalyst System: 3.2 milliliters [25 percent wt./wt.*] Et₂AlCl, 0.25 grams AA TiCl₃, 0.06 grams (c) component

| (c) Component | Crystalline Polypropylene Activity grams/gram TiCl₃/hour | n-Hexane Solubles (Percent) |
|---|---|---|
| [(C₄H₉)₃Sn]₂O | 51.1 | 6.02 |
| [(C₃H₇)₃Sn]₂O | 51.4 | 5.69 |
| [(C₄H₉)₃Sn]₂S | 48.5 | 3.62 |
| None | 50.5 | 6.89 |

*Solution in n-hexane.

EXAMPLE II

Catalyst System: 0.25 milliliters Et$_3$Al, 1.1 milliliters [25 percent wt./wt.] EtAlCl$_2$, 0.125 grams AA TiCl$_3$, 0.06 grams (c) component

| (c) Component | Crystalline Polypropylene, Activity grams/gram TiCl$_3$/hour | n-Hexane Solubles (percent) |
|---|---|---|
| None | 62.4 | 9.50 |
| [(C$_3$H$_7$)$_3$Sn]$_2$O | 59.0 | 4.45 |
| [(C$_4$H$_9$)$_3$Sn]$_2$O | 63.8 | 6.90 |
| [(CH$_3$)$_2$SnO]$_x$ | 55.0 | 3.60 |
| [(C$_4$H$_9$)$_2$SnS]$_x$ | 47.7 | 2.30 |
| [(C$_6$H$_5$)$_3$Sn]$_2$S | 49.7 | 2.60 |

EXAMPLE III

Catalyst System: 3.2 milliliters [25 percent wt./wt.]Et$_2$AlCl, 0.25 grams AA TiCL$_3$, 0.06 grams organotin chalcogenide, 2,6-dimethylpyridine-N-oxide

| (c) Component Organotin Chalcogenide | LNO (milliliters) | Crystalline Polypropylene, Active grams/gram TiCl$_3$/hour | n-Hexane Solubles (Percent) |
|---|---|---|---|
| None | — | 50.5 | 6.90 |
| [(C$_4$H$_9$)$_3$Sn]$_2$S | 0.06 | 45.8 | 1.47 |
| [(C$_4$H$_9$)$_2$SnS]$_x$ | 0.06 | 33.4 | 2.28 |
| [(C$_4$H$_9$)$_3$Sn]$_2$O | 0.06 | 38.7 | 4.45 |
| [(C$_3$H$_7$)$_3$Sn]$_2$O | 0.06 | 39.4 | 5.35 |
| [(C$_4$H$_9$)$_2$SnO]$_x$ | 0.06 | 43.6 | 2.93 |

EXAMPLE IV

Catalyst System: 0.25 milliliters Et$_3$Al, 1.1 milliliters [25 percent wt./wt.] EtAlCl$_2$, 0.06 grams organotin chalcogenide, 2,6-dimethylpyridine-N-oxide, 0.125 grams AA TiCl$_3$

| (c) Component Organotin Chalcogenide | LNO (milliliters) | Crystalline Polypropylene Activity grams/gram TiCl$_3$/hour | n-Hexane Solubles (Percent) |
|---|---|---|---|
| None | — | 62.4 | 9.50 |
| [(C$_4$H$_9$)$_3$Sn]$_2$S | 0.03 | 48.2 | 0.67 |
| [(C$_4$H$_9$)$_2$SnS]$_x$ | 0.03 | 30.2 | 1.95 |
| [(C$_6$H$_5$)$_3$Sn]$_2$S | 0.05 | 43.9 | 1.24 |
| [(C$_4$H$_9$)$_3$Sn]$_2$O | 0.03 | 39.1 | 2.37 |
| [(C$_3$H$_7$)$_3$Sn]$_2$O | 0.03 | 31.8 | 2.45 |

EXAMPLE V

Catalyst System: 0.17 milliliters Et$_3$Al, 1.1 milliliters [25 percent wt./wt.]EtAlCl$_2$, 0.25 grams AA TiCl$_3$

| (c) Component [(C$_4$H$_9$)$_3$Sn]$_2$S (milliliters) | LNO (milliliters) | Crystalline Polypropylene, Activity grams/gram TiCl$_3$/hour | n-Hexane Solubles (Percent) |
|---|---|---|---|
| 0.06 | 0.03 | 30.6 | 0–1 |

EXAMPLE VI

Catalyst System: 0.35 milliliters Et$_3$Al, 1.1 milliliters [25 percent wt./wt.] EtAlCl$_2$, 0.25 grams AA TiCl$_3$

| (c) Component [(C$_4$H$_9$)$_3$Sn]$_2$S (milliliters) | LNO (milliliters) | Crystalline Polypropylene Activity grams/gram TiCl$_3$/hour | n-Hexane Solubles (Percent) |
|---|---|---|---|
| 0.06 | 0.03 | 50.0 | 2 |

EXAMPLE VII

Catalyst System: 0.35 milliliters Et$_3$Al, 1.1 milliliters [25 percent wt./wt.] EtAlCl$_2$, 0.25 grams AA TiCl$_3$

| (c) Component [(C$_4$H$_9$)$_3$Sn]$_2$S (milliliters) | LNO (milliliters) | IMPNO* (grams) | Crystalline Yield grams/gram TiCl$_3$/hour | n-Hexane Solubles (Percent) |
|---|---|---|---|---|
| 0.06 | 0.03 | 0.03 | 50.0 | 1.5 |

*Tetramethylpiperidine nitroxide free radical

We claim:
1. A composition useful for the polymerization of propylene to highly crystalline polypropylene made by combining a sulfide of a bis-(trialkyl)-tin radical wherein the alkyl groups contain between one and six carbon atoms with a dialkylaluminum halide and activated titanium trichloride.

2. The composition of claim 1 wherein said sulfide is bis-(tributyl)tin sulfide and the dialkylaluminum halide is diethylaluminum chloride.

3. A composition useful for the polymerization of propylene to highly crystalline polypropylene made by combining a sulfide of a bis-(tributyl)-tin radical wherein the alkyl groups contain between one and six carbon atoms and 2,6lutidine-N-oxide with a dialkylaluminum halide and activated titanium trichloride wherein the amount of said 2,6-lutidine-N-oxide runs between about 5 and about 15 mol percent of the dialkylaluminum halide used.

4. The composition of claim 3 wherein said sulfide is bis-(tributyl)tin sulfide and the dialkylaluminum halide is diethylaluminum chloride.

* * * * *

UNITED STATES PATENT OFFICE
CERTIFICATE OF CORRECTION

Patent No. 3,950,268          Dated April 13, 1976

Inventor(s)  Nicholas M. Karayannis, Sam S. Lee

It is certified that error appears in the above-identified patent and that said Letters Patent are hereby corrected as shown below:

Column 4, line 6   "a-hexane-soluble" should be -- n-hexane-soluble

"  4   " 16   "Polypropylene Activity" should be -- Crystalline Polypropylene, Activity "  4   " 23   " Order of ratios in" should be --  Order of ratios is "  4   " 56   "Crystalline Yield" should be -- Crystalline Polypropylene, Activity "  5   "  4   "Crystalline Polypropylene Activity" should be Crystalline Yield "  8   " 14   "bis-(tributyl)tin" should be -- bis-(trialkyl)tin "  9   "  2   "2,6 lutidine" should be -- 2,6-lutidine

Signed and Sealed this

Twelfth Day of October 1976

[SEAL]

Attest:

RUTH C. MASON
*Attesting Officer*

C. MARSHALL DANN
*Commissioner of Patents and Trademarks*